United States Patent
Yun et al.

(10) Patent No.: US 10,976,571 B2
(45) Date of Patent: Apr. 13, 2021

(54) EYEGLASSES INCLUDING EYEGLASS TEMPLES HAVING HINGE STRUCTURE AND EYEGLASS TEMPLES MOUNTED THERETO

(71) Applicant: HUMAX OPTIC CORP., Seoul (KR)

(72) Inventors: Hyounggi Yun, Seoul (KR); Zonefeel Kim, Seoul (KR)

(73) Assignee: HUMAX OPTIC CORP., Seoul (KR)

( * ) Notice: Subject to any disclaimer, the term of this patent is extended or adjusted under 35 U.S.C. 154(b) by 0 days.

(21) Appl. No.: 16/641,652

(22) PCT Filed: Mar. 7, 2018

(86) PCT No.: PCT/KR2018/002704
§ 371 (c)(1),
(2) Date: Feb. 25, 2020

(87) PCT Pub. No.: WO2019/054588
PCT Pub. Date: Mar. 21, 2019

(65) Prior Publication Data
US 2020/0387006 A1    Dec. 10, 2020

(30) Foreign Application Priority Data

Sep. 15, 2017  (KR) .......................... 10-2017-0118670
Jan. 31, 2018  (KR) .......................... 10-2018-0012198

(51) Int. Cl.
*G02C 5/22*        (2006.01)
*G02C 5/16*        (2006.01)

(52) U.S. Cl.
CPC ............. *G02C 5/2254* (2013.01); *G02C 5/16* (2013.01); *G02C 5/2209* (2013.01); *G02C 2200/10* (2013.01)

(58) Field of Classification Search
CPC ...... G02C 5/2254; G02C 5/16; G02C 5/2209; G02C 2200/10
See application file for complete search history.

(56) References Cited

U.S. PATENT DOCUMENTS

2007/0126980 A1    6/2007  Carlon
2014/0218676 A1    8/2014  Carlon

FOREIGN PATENT DOCUMENTS

DE      19956328 A1     6/2001
EP       0814360 A1    12/1997
(Continued)

OTHER PUBLICATIONS

International Search Report in International Application No. PCT/KR2018/002704, dated Jun. 11, 2018, 2 pages.
(Continued)

*Primary Examiner* — Tuyen Tra
(74) *Attorney, Agent, or Firm* — Park, Kim & Suh, LLC

(57) ABSTRACT

The present invention relates to eyeglasses including eyeglass temples having a hinge structure, and eyeglass temples mounted thereto, and more particularly, to eyeglasses in which a state in which eyeglass temples are folded or unfolded can be stably maintained and the eyeglass temples and eyeglass frame can be connected by even a simple configuration. The present invention provides eyeglasses and eyeglass temples mounted thereto, the eyeglasses being characterized by including: an eyeglass frame into which lenses can be inserted; hinge shafts rotatably inserted into hinge holes of the eyeglass frame; first extension parts extending toward one side from an end of each of the hinge shafts; second extension parts extending upward from an end of each of the first extension parts; first support parts that are connected to the second extension parts and can be supported on the front surface or side surface of the eyeglass frame; and second support parts that are connected to the (Continued)

first support parts in a bent shape and can be supported on the side surfaces or rear surfaces of the eyeglass frame, wherein support is provided in a first area by each of the hinge shafts, in a second area by each of the second extension parts and the first support parts, and in a third area by each of the second support parts.

4 Claims, 14 Drawing Sheets

(56) References Cited

FOREIGN PATENT DOCUMENTS

| EP | 0838711 A1 | 4/1998 | | |
|---|---|---|---|---|
| JP | H07-225354 A | 8/1995 | | |
| KR | 20-0174165 Y1 | 3/2000 | | |
| KR | 20-2000-0019320 U | 11/2000 | | |
| KR | 10-2017-0115721 A | 10/2017 | | |
| KR | 2017115721 A | * 10/2017 | ............... | G05C 5/22 |
| KR | 2018017416 A | * 2/2018 | ............... | G02C 5/22 |
| WO | 98/19203 A1 | 5/1998 | | |
| WO | 99/42890 A1 | 8/1999 | | |
| WO | 2009/103355 A1 | 8/2009 | | |

OTHER PUBLICATIONS

European Search Report in Application No. 18855909.0 dated Sep. 1, 2020.

* cited by examiner (a)          (b)

(a)

(b)

EYEGLASSES INCLUDING EYEGLASS TEMPLES HAVING HINGE STRUCTURE AND EYEGLASS TEMPLES MOUNTED THERETO

CROSS-REFERENCE TO RELATED APPLICATIONS

This application is the National Stage filing under 35 U.S.C. 371 of International Application No. PCT/KR2018/002704, filed on Mar. 7, 2018, which claims the benefit of Korean Patent Application No. 10-2017-0118670, filed on Sep. 15, 2017, and Korean Patent Application No. 10-2018-0012198, filed on Jan. 31, 2018, the contents of which are all hereby incorporated by reference herein in their entirety.

TECHNICAL FIELD

The present disclosure relates to glasses including eyeglass temples having a hinge structure and an eyeglass temple installed therein, and more particularly, to glasses in which an eyeglass temple is stably maintained to be folded or unfolded and the eyeglass temples and the glass frame are connected to each other using only a simple structure.

BACKGROUND ART

Conventionally, when eyeglass temples are rotatably installed in a glass frame, a separate coupling member for rotatably supporting an end of an eyeglass temple at a side of the glass frame, for example, a bolt or a hinge is used. In this case, since the separate coupling member is required, manufacturing costs are increased and a manufacturing process for assembling the glass frame and the eyeglass temples using the coupling member is required.

To overcome this problem, Korean Utility Model Registration No. 20-0174165 discloses a technology for rotatably supporting eyeglass temples at a glass frame by bending front ends of the eyeglass temples and inserting the front ends into the glass frame.

In FIG. 7 of Korean Utility Model Registration No. 20-0174165, hinge protrusions formed by bending the eyeglass temples are inserted into hinge holes of the glass frame, respectively, and in this state, the eyeglass temples are folded and unfolded.

However, in this case, when the eyeglass temples are unfolded, the eyeglass temples are supported by only one surface (lateral surface) of the glass frame, and thus, if excessive external force is applied outwards to the eyeglass temples, there is a problem in that it is difficult to prevent arrangement positions of the eyeglass temples from being changed using only an area of the one support surface.

DISCLOSURE

Technical Problem

It is an object of the present disclosure to provide glasses for stably maintaining an arrangement state in which eyeglass temples are unfolded and preventing eyeglass temples from being deformed even if external excessive force is applied in a state in which the eyeglass temples are unfolded.

It is another object of the present disclosure to provide glasses for stably maintaining a state in which eyeglass temples are folded and a state in which the eyeglass temples are unfolded to prevent the eyeglass temples from being damaged irrespective of user's intent.

Technical Solution

According to an embodiment of the present disclosure, glasses include a glass frame into which a lens is inserted, a hinge axis rotatably inserted into a hinge hole of the glass frame, a first extension portion extending in one side direction from a lower end portion of the hinge axis, a second extension portion extending upward from an end portion of the first extension portion, a first support connected to the second extension portion and supported against a front or lateral surface of the glass frame, and a second support connected to the first support in a bending form and supported against a lateral or rear surface of the glass frame, wherein support through the hinge axis in a first region, support through the second extension portion and the first support in a second region, and support through the second support in a third region may be performed.

The hinge axis and the second extension portion may be spaced apart from each other in a right and left direction, the first extension portion and the first support may be spaced apart from each other in an up and down direction, and the first support and the hinge axis may be spaced apart from each other in a forward and backward direction.

The hinge axis and the second extension portion may be spaced apart from each other and are arranged in parallel to each other, and the second extension portion may be a torsion bar providing elastic restraint or elastic restoring force against distortion between the first extension portion and the first support when the eyeglass temple is rotated.

A first inclination angle may be formed between the first extension portion and the first support on a plane, a second inclination angle may be formed between the first support and the second support, and elastic deformation between the first extension portion and the second extension portion, elastic deformation between the second extension portion and the first support, and elastic deformation between the first support and the second support may be performed, and the first inclination angle and the second inclination angle may be temporally changed while the eyeglass temple is folded or unfolded.

The glass frame may include a front surface portion, a lateral flange groove, a rear flange groove, a first edge between the front surface portion and the lateral flange groove, and a second edge between the lateral flange groove and the rear flange groove, a distance to the front surface portion from a center of the hinge axis, a distance to a lateral flange groove from the center of the hinge axis, and a distance to the rear flange groove from the center of the hinge axis may be the same, a distance to the first edge from the center of the hinge axis and a distance to the second edge from the center of the hinge axis may be the same, the distance to the first edge from the center of the hinge axis and the distance to the second edge from the center of the hinge axis may be greater than the distance to the front surface portion from a center of the hinge axis, the distance to the lateral flange groove from the center of the hinge axis, and the distance to the rear flange groove from the center of the hinge axis, and when the eyeglass temple is folded or unfolded, the first and second edges may act as resistance and may cause elastic restoring force through elastic distortion deformation of the second extension portion and elastic restoring force through elastic deformation of an interval or an inclination angle between the first support and the second support.

According to another embodiment of the present disclosure, an eyeglass temple includes a hinge axis disposed in an up and down direction, a first extension portion extending in one side direction from a lower end portion of the hinge axis, a second extension portion extending in an opposite direction to a direction in which the hinge axis extends from an end portion of the first extension portion, a first support connected to one end portion of the second extension portion and extending in a direction that crosses a direction in which the second extension portion extends, and a second support connected to the first support in a bending form and extending in a backward direction compared with the first support, wherein support through the hinge axis in a first region, support through the second extension portion and the first support in a second region, and support through the second support in a third region may be performed.

The hinge axis and the second extension portion may be spaced apart from each other in a right and left direction, the first extension portion and the first support may be spaced apart from each other in an up and down direction, and the first support and the hinge axis may be spaced apart from each other in a forward and backward direction.

The hinge axis and the second extension portion may be spaced apart from each other and are arranged in parallel to each other, and the second extension portion may be a torsion bar providing elastic restraint or elastic restoring force against distortion between the first extension portion and the first support when the eyeglass temple is rotated.

A first inclination angle may be formed between the first extension portion and the first support on a plane, a second inclination angle may be formed between the first support and the second support, and elastic deformation between the first extension portion and the second extension portion, elastic deformation between the second extension portion and the first support, and elastic deformation between the first support and the second support may be+ performed, and the first inclination angle and the second inclination angle may be temporally changed while the eyeglass temple is folded or unfolded.

A distance to the first support from a center of the hinge axis and a distance to the second support from the center of the hinge axis may be the same, a distance to a portion at which the first support and the second support are bent from the center of the hinge axis may be greater than a distance to the first support from the center of the hinge axis and the distance to the second support from the center of the hinge axis, and when the eyeglass temple is folded or unfolded, if the first support and the second support are caught by a predetermined flange resistance region, elastic restoring force through elastic distortion deformation of the second extension portion and elastic restoring force through elastic deformation of an interval or an inclination angle between the first support and the second support may be caused.

Advantageous Effects

According to the present disclosure, a fore end of an eyeglass temple formed of thin metal may be rotatably connected directly to a glass frame, and a component such as a hinge or a screw is not required, and thus, the eyeglass temple may be lightweight, the number of assembled parts may be reduced, and assembly characteristics may be enhanced, thereby reducing manufacturing costs.

Elastic restoring force may be provided to an eyeglass temple in a plurality of regions, and thus, when the eyeglass temple is unfolded or folded with respect to a glass frame, the current state may be stably maintained.

In particular, a second extension portion that function as a torsion bar may provide elastic restoring force for maintaining a first inclination angle, elastic restoring force for maintaining a second inclination angle between the first support and the second support may be provided to a bent region between a first support and a second support, and when external force for folding or unfolding the eyeglass temples is applied, in the case of in which the first support contacts a first edge and in the case of the second support contacts a second edge, if the external force does not exceed the above elastic restoring force, the eyeglass temple is likely to be continuously maintained in an original state (the folded state or the unfolded state), and thus, the state of the eyeglass temple may be stably maintained.

When the glass frame and the eyeglass temple are formed of different material, a tube may prevents the glass frame and the eyeglass temple from being damaged therebetween, and the eyeglass temple may be stably and rotatably supported against the glass frame.

BEST MODE

Figure 1:
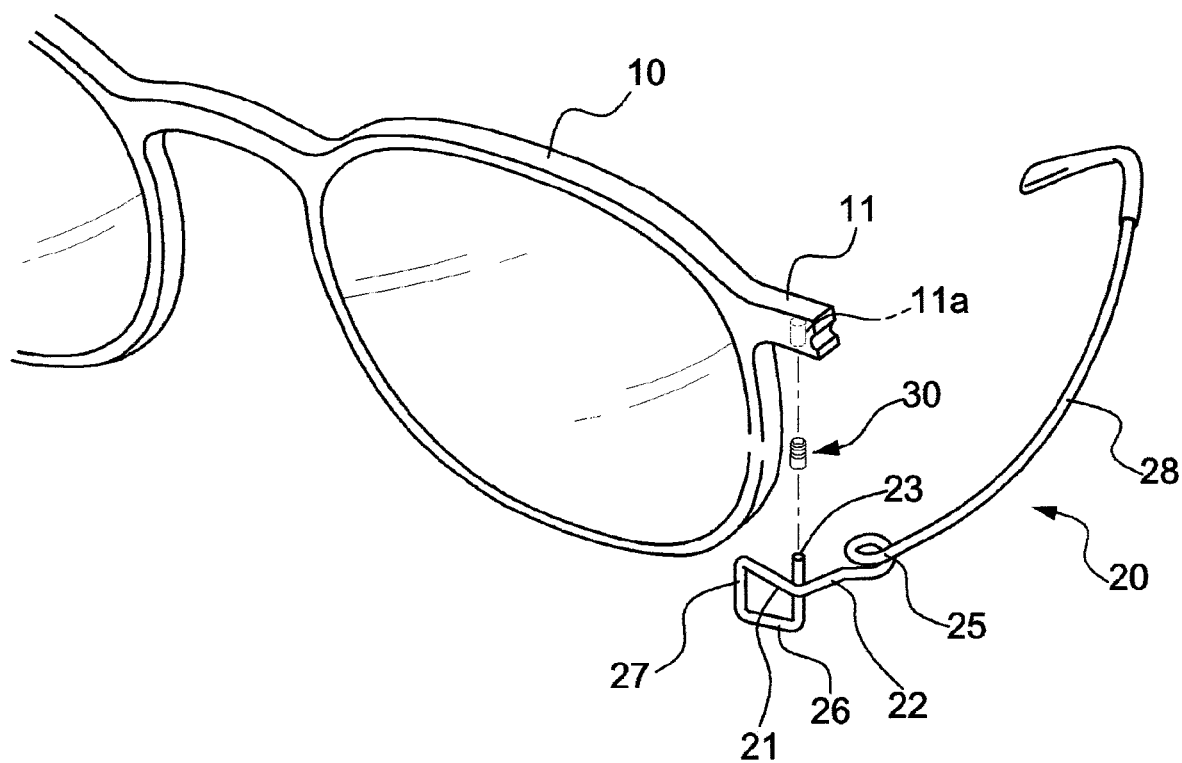
FIG. 1 is a perspective view illustrating a state in which an eyeglass temple is disassembled from a glass frame according to the present disclosure.

As the present disclosure allows for various changes and numerous embodiments, particular embodiments will be illustrated in the drawings and described in detail in the written description.

However, this is not intended to limit the present disclosure to particular modes of practice, and it is to be appreciated that all changes, equivalents, and substitutes that do not depart from the spirit and technical scope of the present disclosure are encompassed in the present disclosure.

The terms such as "first" and "second" are used herein merely to describe a variety of constituent elements, but the constituent elements are not limited by the terms.

The terms are used only for the purpose of distinguishing one constituent element from another constituent element.

For example, a first element may be termed a second element and a second element may be termed a first element without departing from the teachings of the present disclosure.

As used herein, the term "and/or" includes any and all combinations of one or more of the associated listed items.

It will be understood that when an element, such as a layer, a region, or a substrate, is referred to as being "on", "connected to" or "coupled to" another element, it may be directly on, connected or coupled to the other element or intervening elements may be present.

In contrast, when an element is referred to as being "directly on," "directly connected to" or "directly coupled to" another element or layer, there are no intervening elements or layers present.

The terms used herein is for the purpose of describing particular embodiments only and is not intended to be limiting of the present disclosure.

The singular forms "a," "an" and "the" are intended to include the plural forms as well, unless the context clearly indicates otherwise.

It will be further understood that the terms "comprises" or "comprising" when used in this specification, specify the presence of stated features, integers, steps, operations, elements, or components, but do not preclude the presence or addition of one or more other features, integers, steps, operations, elements, components, or groups thereof.

Hereinafter, the present disclosure will be described in detail by explaining exemplary embodiments of the invention with reference to the attached drawings. The same reference numerals in the drawings denote like elements, and a repeated explanation thereof will not be given.

As shown in FIG. 1, glasses according to the present disclosure may include a glass frame 10 into which a lens is inserted, and eyeglass temples 20 that are rotatably coupled to a lateral surface of the glass frame 10 and are to be folded and unfolded.

In general, the glass frame 10 may be formed of a metallic material or a synthetic resin and the eyeglass temples 20 may also be formed of a metallic material or a synthetic resin.

An installation portion 11 at which the eyeglass temples 20 are rotatably installed may be provided next to the glass frame 10, and the installation portion 11 may protrude out of the glass frame 10.

A hinge hole 11a may be provided in a lower surface (or upper surface) of the installation portion 11.

A hinge axis 23 included in the eyeglass temple 20 and a tube 30 that surrounds the hinge axis 23 and prevents contact direction between the hinge axis 23 and internal surface of the hinge hole 11a may be installed in the hinge hole 11a.

That is, the tube 30 may be inserted into the internal surface of the hinge hole 11a, and the hinge axis 23 may be inserted into the tube 30 to rotatably support the eyeglass temple 20.

Detailed components of the eyeglass temple 20 will be described below.

Based on the state in which the eyeglass temple 20 is completely unfolded, the eyeglass temple 20 may include a first support 21 that contacts a front surface of the glass frame 10 (or the installation portion 11) to be supported thereby, and is positioned in a right and left direction (horizontal direction), and a second support 22 that is bent backward based on the first support 21, contacts a lateral surface of the glass frame 10 (or the installation portion 11) to be supported thereby, and is positioned in a forward and backward direction.

A coil portion 25 that functions as a buffer in the case of strength reinforcement and external pressurization may be provided behind the second support 22, and a holder 28 that is held at a lateral surface of the head and the ear of a user may be provided behind the coil portion 25.

The eyeglass temple 20 may further include a first extension portion 26 that extends in one side direction from a lower end portion (or an upper end portion) of the hinge axis 2326 constituting an end portion of the eyeglass temple 20 and is positioned in a right and left direction (horizontal direction), and a second extension 27 that functions as a torsion bar shaped like a vertical column or a vertical bar that extends in an up and down direction from one end portion of the first extension portion 26.

One end portion of the second extension 27 may be connected to the first support 21, and the second extension 27 and the first support 21 may be connected to each other to be elastically deformed. A region at which components are connected to each other to be elastically deformed may correspond to a region between the hinge axis 23 and the first extension portion 26, a region between the first extension portion 26 and the second extension 27, and a region between the first support 21 and the second support 22.

FIGS. 2 to 5 are diagrams showing a detailed state of the eyeglass temple 20.

Figure 2:
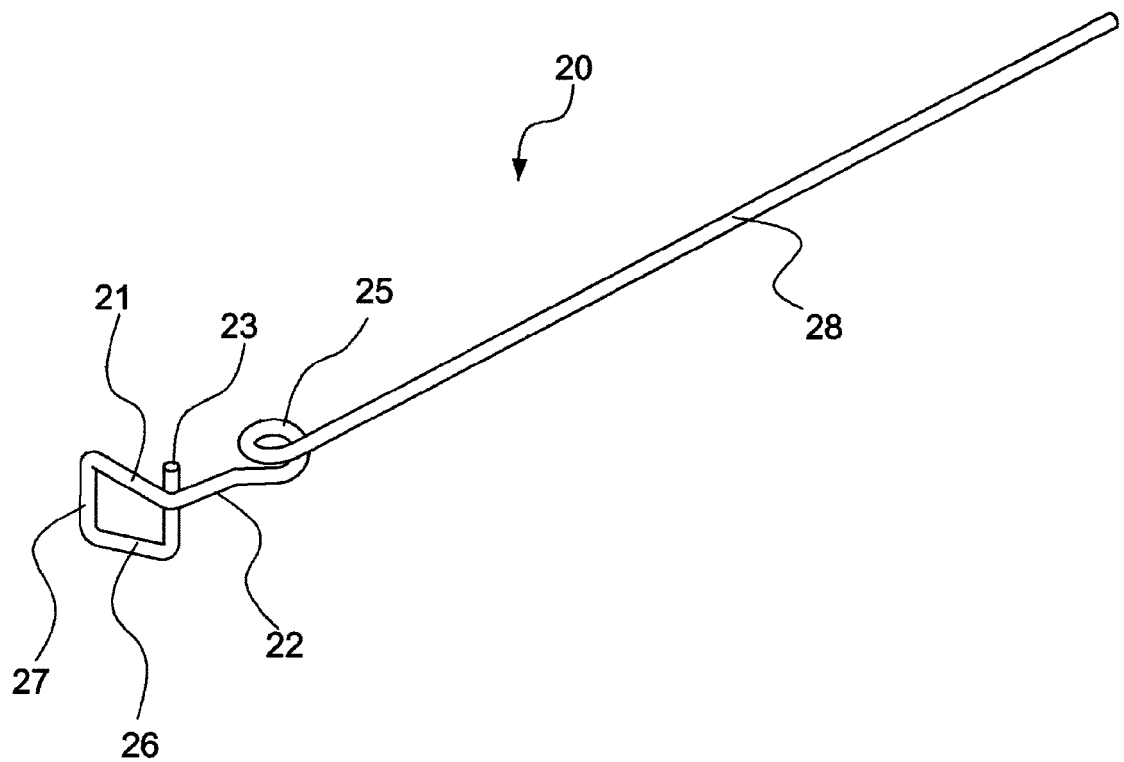
FIG. 2 is a perspective view of an eyeglass temple according to the present disclosure.
Figure 3:
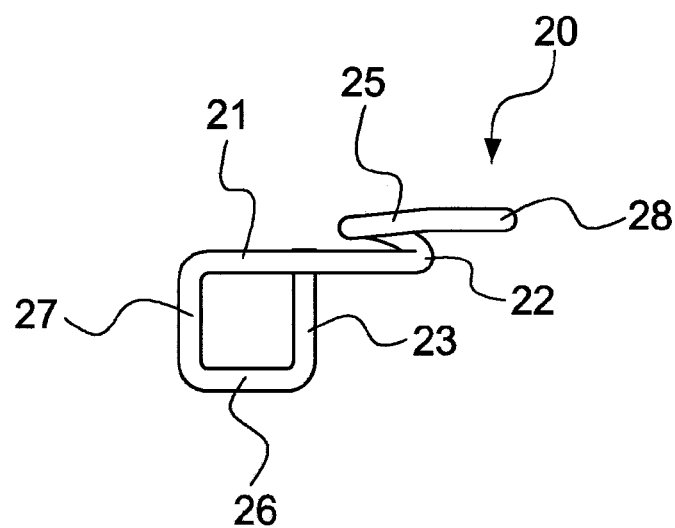
FIG. 3 is a front view of an eyeglass temple according to the present disclosure.
Figure 4:
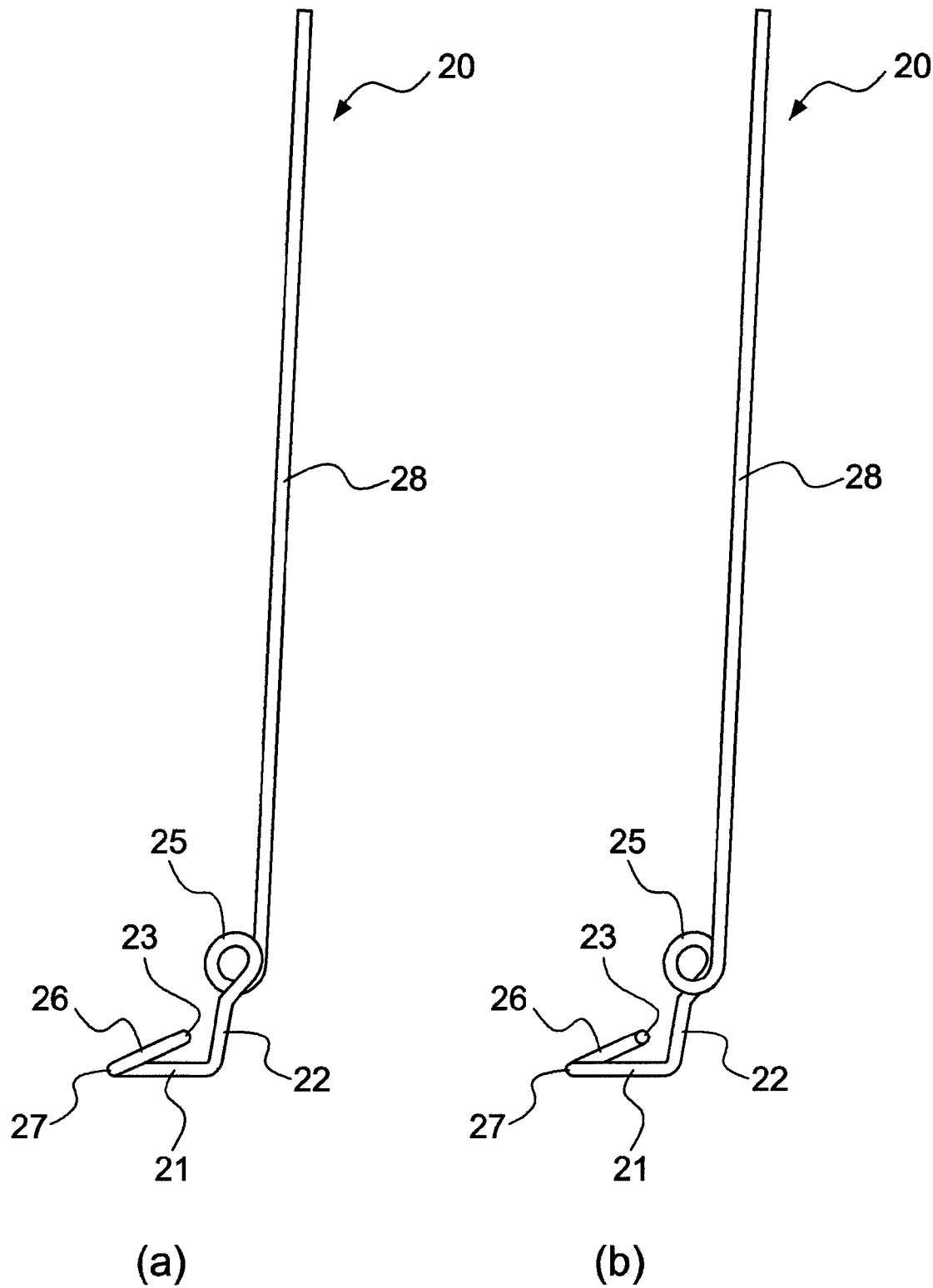
FIG. 4 is a plan view and a bottom view of an eyeglass temple according to the present disclosure.

As shown in FIGS. 2 and 3, the hinge axis 23 may be positioned in an up and down direction, the first extension portion 26 may extend in one side direction from a lower end portion of the hinge axis 23, the second extension 27 may extend in an upper direction from one end portion of the first extension portion 26, the first support 21 may extend in the other side direction from an upper end portion of the second extension 27 (in an overall opposite direction to the direction in which the first extension portion 26 extends), and the second support 22 may extend in a backward direction from an end portion of the first support 21.

The hinge axis 23 may be spaced apart from the first support 21 and the second support 22.

The hinge axis 23 and the second extension 27 may be spaced apart from each other in a left direction or a lateral side direction, which is obviously viewed from a front surface.

The first support 21 and the first extension portion 26 may be spaced apart from each other in an up and down direction, and as shown in FIG. 3, viewed from a front surface, an arrangement state thereof may embody a shape 'ㅁ'.

FIG. 4A is a diagram of an eyeglass temple viewed from the below and FIG. 4B is a diagram of the eyeglass temples from the above.

As shown in FIGS. 4A and 4B, the first support 21 and the first extension portion 26 may not be connected directly to each other, but may be connected indirectly to each other through the second extension 27.

Viewed from the above or the below, the first support 21 and the first extension portion 26 may not overlap each other and may be inclined with respect to each other based on a part at which the second extension 27 is positioned, as an apex.

That is, an inclined state may be maintained while the first support 21 is maintained in a horizontal state and the first extension portion 26 is maintained at a predetermined angle with respect to the first support 21. However, this relationship may be inverse depending on the state of the glass frame 10. That is, an inclined state may also be maintained while the first extension portion 26 is maintained in a horizontal state and the first support 21 is maintained at a predetermined angle with respect to the first extension portion 26.

Here, an inclination angle between the first support 21 and the first extension portion 26 may be maintained at an acute angle.

The first support 21 and the second support 22 may be bent with respect to each other and may be maintained in an inclined state. That is, the second support 22 may be bent from an end portion of the first support 21 and may extend backward while the first support 21 is maintained in a horizontal state, and thus, the first support 21 and the second support 22 may be inclined with respect to each other.

Here, an inclination angle between the first support 21 and the second support 22 may be maintained at an obtuse angle.

FIG. 5A is a right side view of the eyeglass temple 20 and FIG. 5B is a left side view of the eyeglass temple 20.

Figure 5:
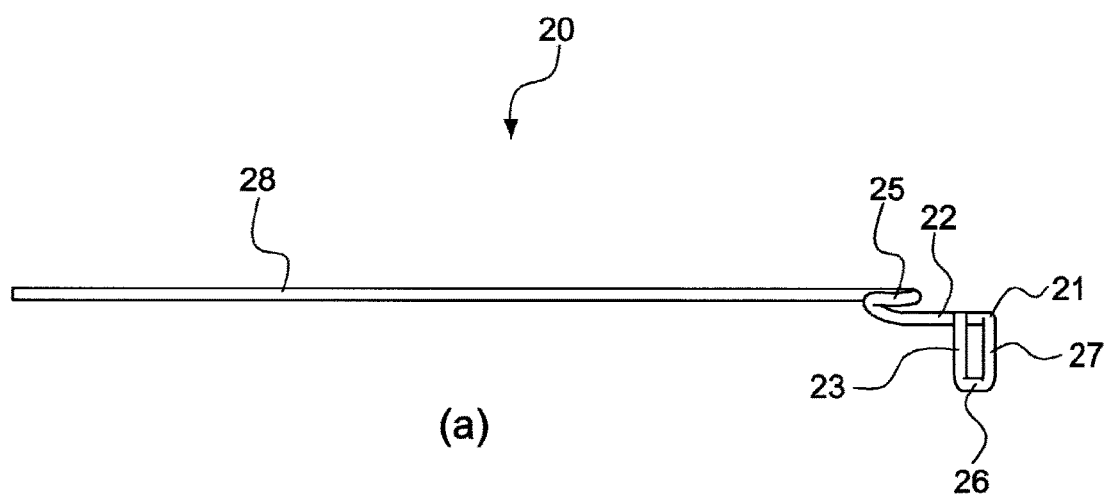
FIG. 5 is a set of diagrams of right and left side views of an eyeglass temple according to the present disclosure.
Figure 5:
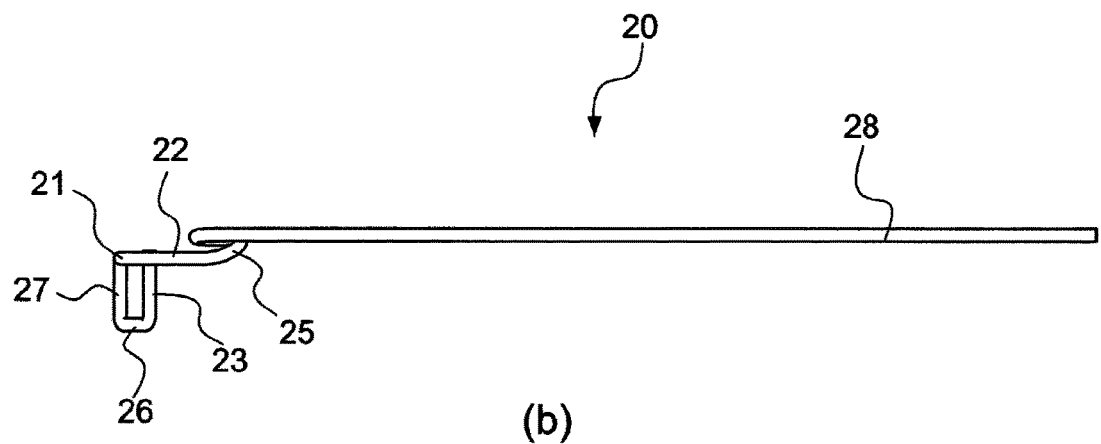

As shown in FIG. 5, the second extension 27 may be disposed before the hinge axis 23, and a lower end portion of the hinge axis 23 and a lower end portion of the second extension 27 may be connected to each other by the first extension portion 26.

An upper end portion of the hinge axis 23 may be disposed with a height that reaches an upper end region of the first support 21 and the second support 22, and thus, when the eyeglass temple 20 is viewed from the front, an upper end portion of the hinge axis 23 may overlap the first support 21, as shown in FIG. 3, and when the eyeglass temple 20 is viewed from the side, the upper end portion of the hinge axis 23 may overlap the second support 22, as shown in FIG. 5.

The coil portion 25 may be provided behind the second support 22 and the holder 28 may be provided behind the coil portion 25, and thus, the second support 22 and the holder 28 may be disposed at different height levels.

Figure 6:
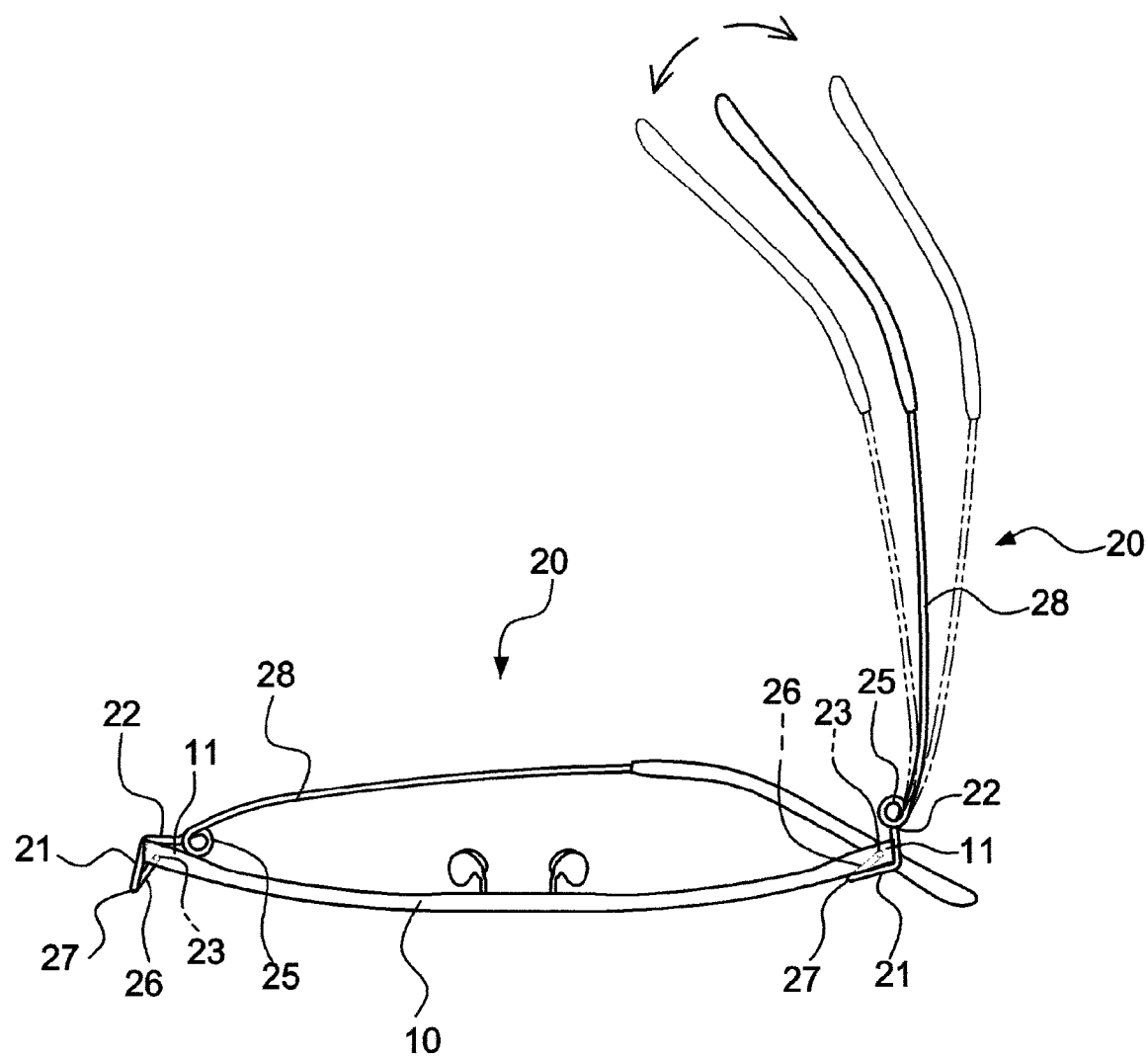
FIG. 6 is a plan view according to the present disclosure.
Figure 7:
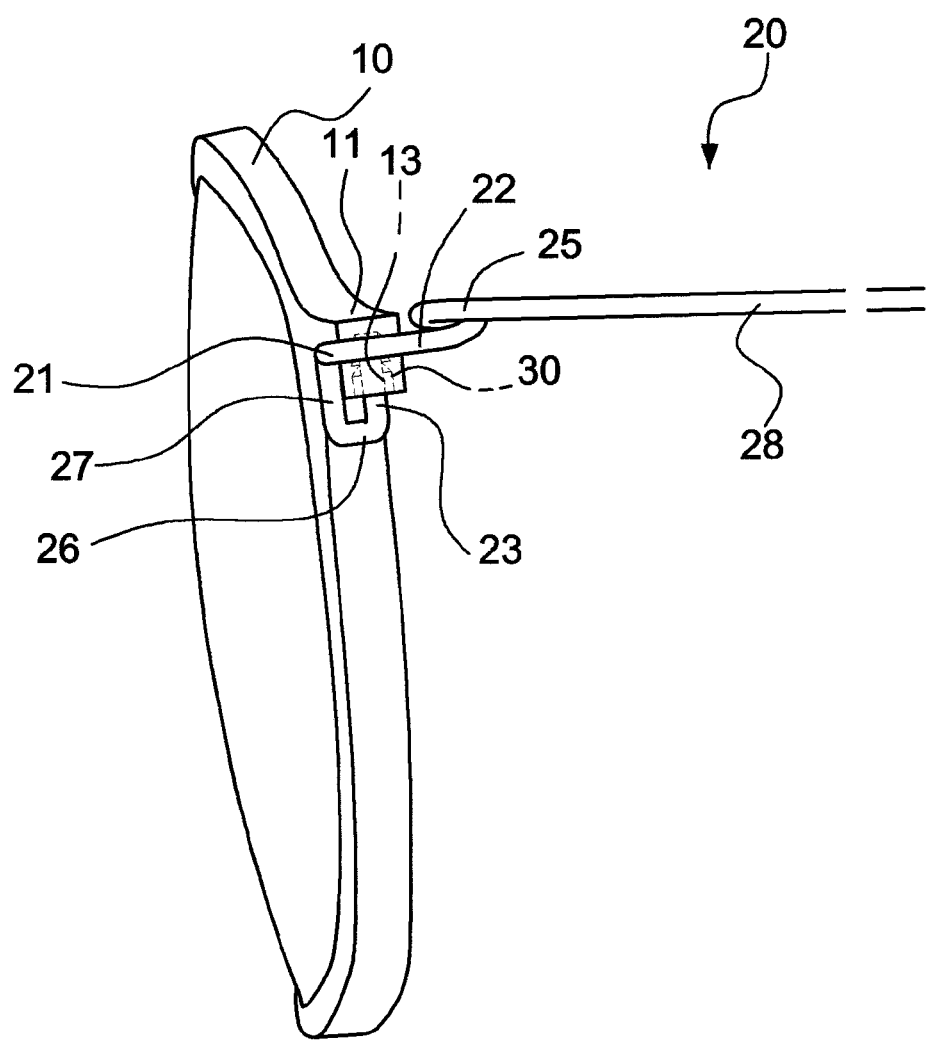
FIG. 7 is a side view according to the present disclosure.

As shown in FIGS. 6 and 7, when the eyeglass temple 20 is maintained to be unfolded with respect to the glass frame 10, the hinge axis 23 of the eyeglass temple 20 may be primarily supported by a hinge hole 13 and the tube 30.

The second extension 27 and the first support 21 may contact a front surface of the glass frame 10 (or the installation portion 11) and may be secondarily supported, and the second support 22 may contact a lateral surface of the glass frame 10 (or the installation portion 11) and may be tertiarily supported.

Accordingly, according to the present disclosure, the eyeglass temple 20 may be supported against the glass frame 10 at three regions, and thus, may be maintained in a more stable position with respect to the glass frame 10.

In particular, as shown in FIG. 6, when the eyeglass temple 20 is bent outward, the second support 22 may be supported by the lateral surface of the glass frame 10 (or the installation portion 11) and the first support 21 may be supported by the front surface of the glass frame 10 (or the installation portion 11), thereby preventing the eyeglass temple 20 from being actually deformed outward.

The eyeglass temple 20 may be prevented from being deformed outward by elastic restoring force and restraint of the first extension portion 26 and the second extension 27 that are positioned between the hinge axis 23 that is fixedly positioned and the first support 21 that is movably positioned.

In particular, in the case of the second extension 27, the first extension portion 26 connected to the hinge axis 23 may be connected to a lower end of the second extension 27 and the first support 21 may be connected to an upper end of the second extension 27, in this regard, when the eyeglass temple 20 is bent outward, the first support 21 is likely to be slightly moved forward, but the hinge axis 23 and the first extension portion 26 connected thereto are likely to be maintained in the current position, and thus, the upper end portion of the second extension 27 is likely to be rotated along the first support 21 and the lower end portion of the second extension 27 is likely to be maintained in the current position like the first extension portion 26 or is likely to be relatively rotated in an opposite direction to the rotation direction of the upper end portion of the second extension 27 due to pulling force of the first extension portion 26, and thus, the second extension 27 may be overall distorted.

However, rotation of the upper end portion of the second extension 27 may be prevented as much as possible due to torsional resistance of the second extension 27, and the eyeglass temple 20 may be prevented from being deformed and bent outward due to such restraint. From this point of view, the second extension 27 may function of a kind of torsion bar for preventing the eyeglass temple 20 from being bent or deformed outward.

Figure 8:
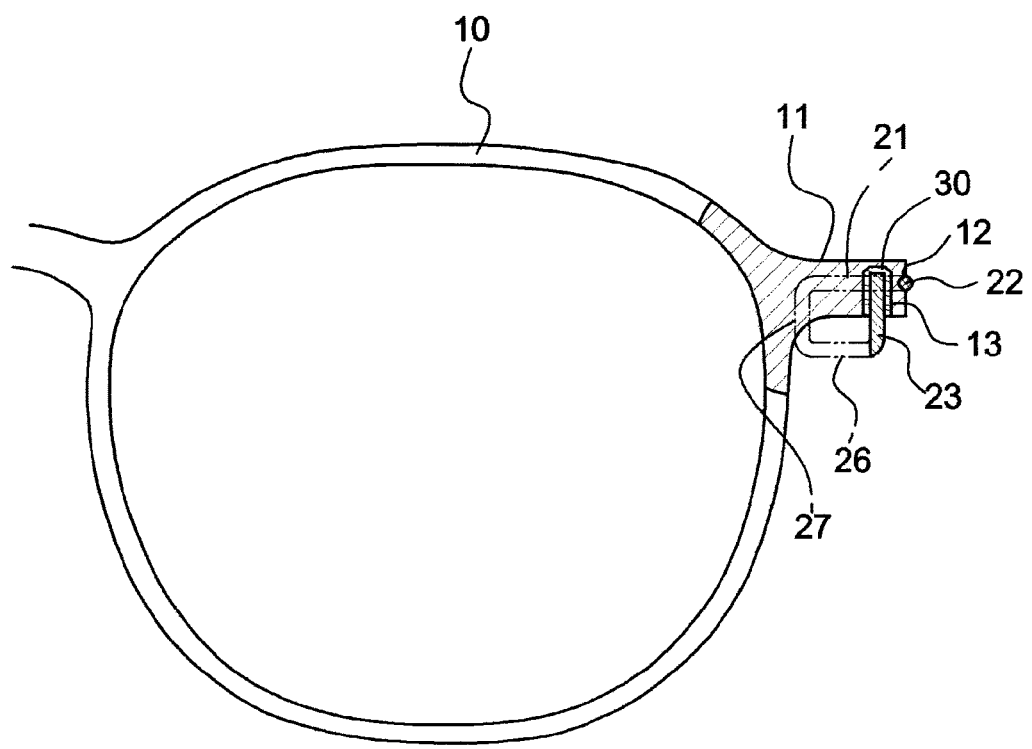
FIG. 8 is a partial enlarged front view according to the present disclosure.
Figure 9:
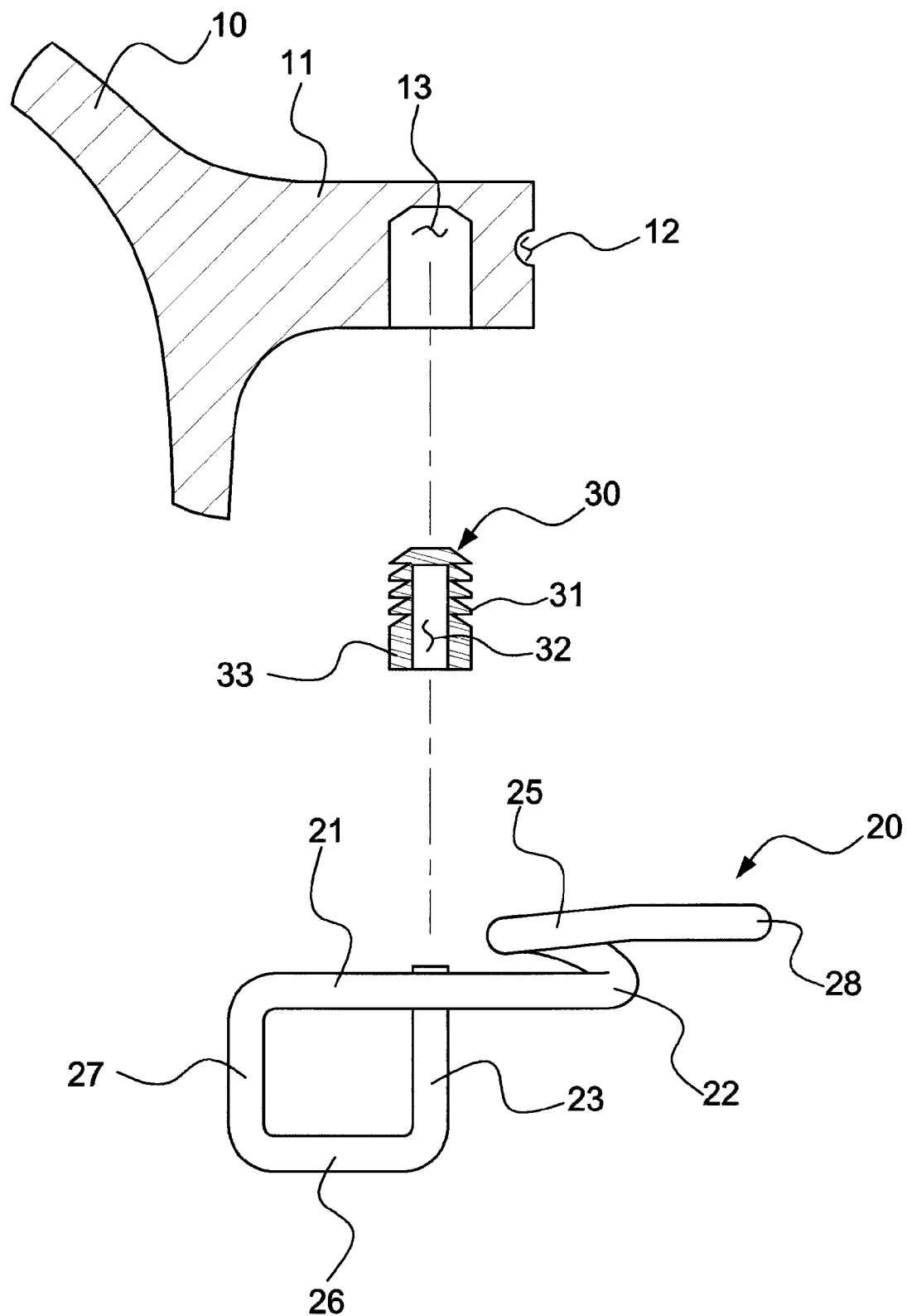
FIG. 9 is an enlarged view of a state in which main components are dissembled according to the present disclosure.

As shown in FIGS. 8 and 9, a lateral flange groove 12 for maintaining the eyeglass temple in an unfolded state may be provided in a lateral surface of the glass frame 10 (or the installation portion 11). In the state in which the eyeglass temple 20 is unfolded, the second support 22 may be inserted into the lateral flange groove 12 to be caught thereby.

In the state in which the eyeglass temple 20 is unfolded, the first extension portion 26 may be spaced apart from a surface of the glass frame 10 (or the installation portion 11), a lower region of the second extension 27 may be spaced apart from the surface of the glass frame 10 (or the installation portion 11), an upper region of the second extension 27 may contact the surface of the glass frame 10 (or the installation portion 11) to be supported thereby, and the first support 21 may also contact the surface of the glass frame 10 (or the installation portion 11) to be supported thereby.

The hinge hole 13 formed in the glass frame 10 (or the installation portion 11) may extend upward from the below, and an upper portion of the hinge hole 13 may be closed and the converse may also be possible.

The tube 30 may be inserted into the hinge hole 13, and the hinge axis 23 may be inserted into an insertion hole 32 provided inside the tube 30 and may be rotatably supported.

The tube 30 may be formed silicon, rubber, or other metallic materials. When the glass frame 10 and the eyeglass temple 20 are formed of different materials, the tube 30 may function as a buffer in order to prevent the glass frame 10 and the eyeglass temple 20 from being damaged therebetween and may simultaneously function as a holder for stably and rotatably fixing the hinge axis 23 of the eyeglass temple 20 to the glass frame 10.

A flange protrusion 31 for preventing the tube 30 from being separated from the hinge hole 13 after the tube 30 is inserted into the hinge hole 13 may be formed on an upper region of an outer circumference of the tube 30, and a smooth outer circumference 33 may be provided on a lower region. The tube 30 may be fixed to the hinge hole 13 at the upper region of the tube 30, and the hinge axis 23 may be rotatably fixed inside the tube 30 by pressurization of the smooth outer circumference 33.

Figure 10:
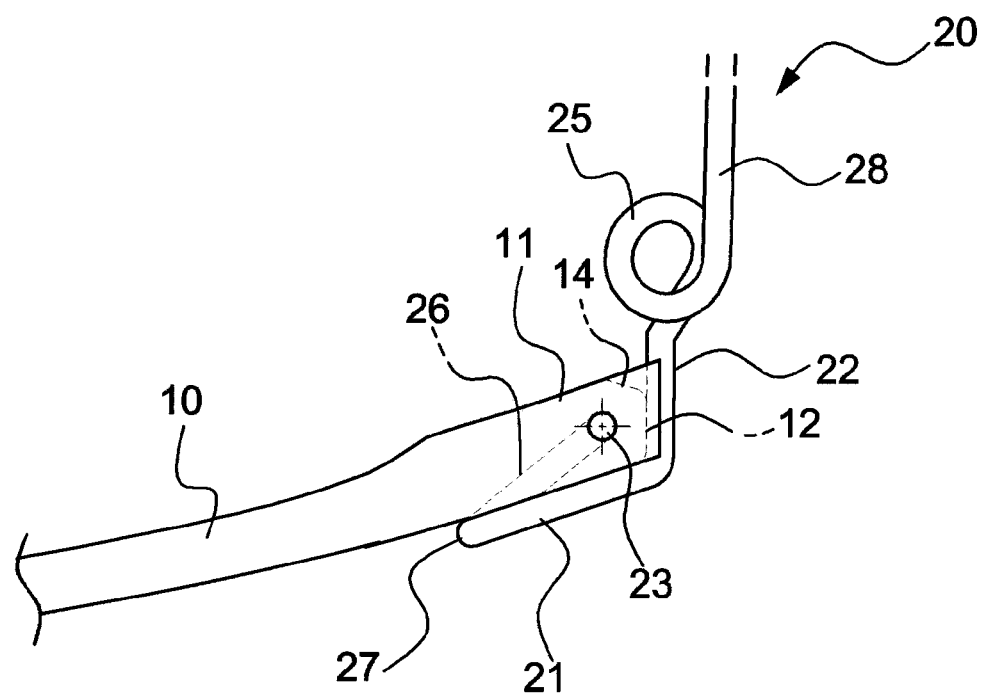
FIG. 10 is a plan illustrating a state in which an eyeglass temple is unfolded according to the present disclosure.
Figure 11:
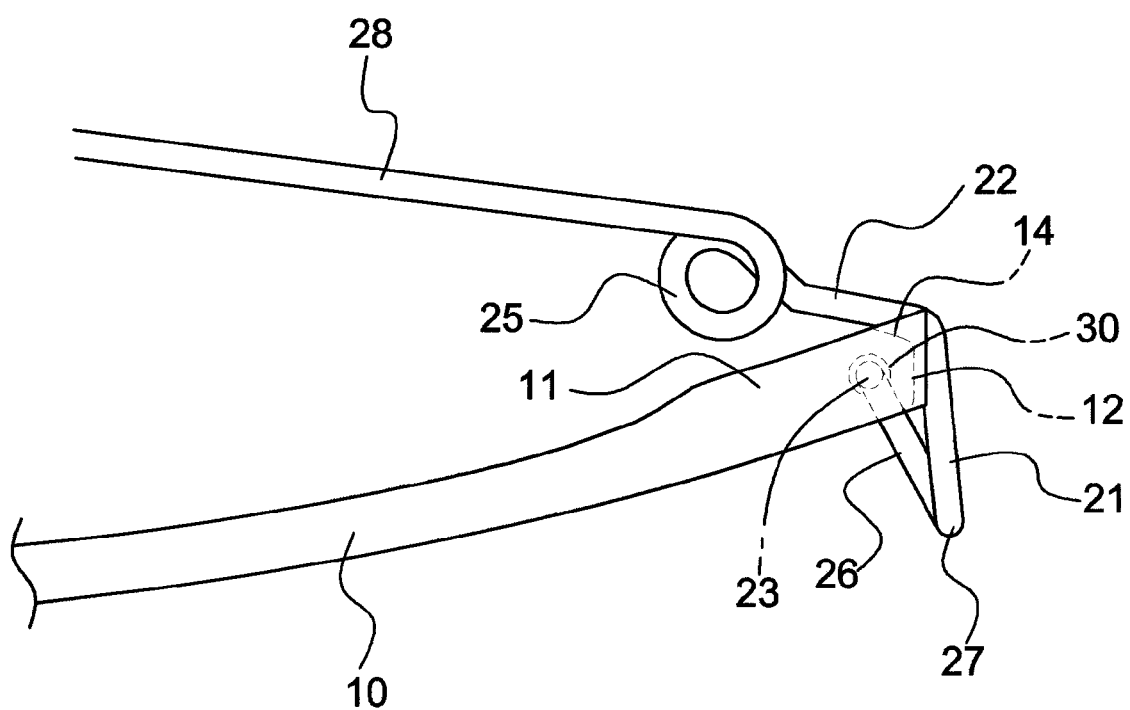
FIG. 11 is a plan view illustrating an eyeglass temple is folded according to the present disclosure.

FIG. 10 is a schematic diagram illustrating a state in which the eyeglass temple 20 is unfolded with respect to the glass frame 10. FIG. 11 is a schematic diagram illustrating a state in which the eyeglass temple 20 is folded with respect to the glass frame 10.

As shown in FIG. 10, in a state in which the eyeglass temple 20 is spread and the hinge axis 23 is positioned in the hinge hole, the first extension portion 26 may be inclined inward, and the second extension 27 and the first support 21 may contact a front surface of the glass frame 10 (or the installation portion 11) to be supported thereby.

The second support 22 may be maintained to be supported and caught by the lateral flange groove 12. An inclination angle of an edge from the front surface of the glass frame 10 (or the installation portion 11) to the lateral flange groove 12 may correspond to an inclination angle formed between the first support 21 and the second support 22.

Thus, when the two inclination angles are the same, a state in which the front surface of the glass frame 10 (or the installation portion 11) is close to the first support 21 and a state in which the second support 22 is close to the lateral flange groove 12 may be simultaneously achieved.

As shown in FIG. 11, in a state in which the eyeglass temple 20 is folded and the hinge axis 23 is positioned in the hinge hole, the first extension portion 26 may be inclined outward and the second extension 27 may be spaced apart from the front surface of the glass frame 10 (or the installation portion 11).

A front region of the first support 21 may also be spaced apart from the front surface of the glass frame 10 (or the installation portion 11), and a rear region of the first support 21 may be caught and supported by the lateral flange groove 12. A rear flange groove 14 may extend from the lateral flange groove 12 on a rear surface of the glass frame 10 (or the installation portion 11), and a portion of the second support 22 may be caught and supported by the rear flange groove 14.

With referenced to FIGS. 12 to 14, a state in which the eyeglass temple 20 according to the present disclosure is unfolded, a state in which the eyeglass temple 20 is folded, an intermediary change between the states, positions of components, and a change in relationship between the components will be described below.

Figure 12:
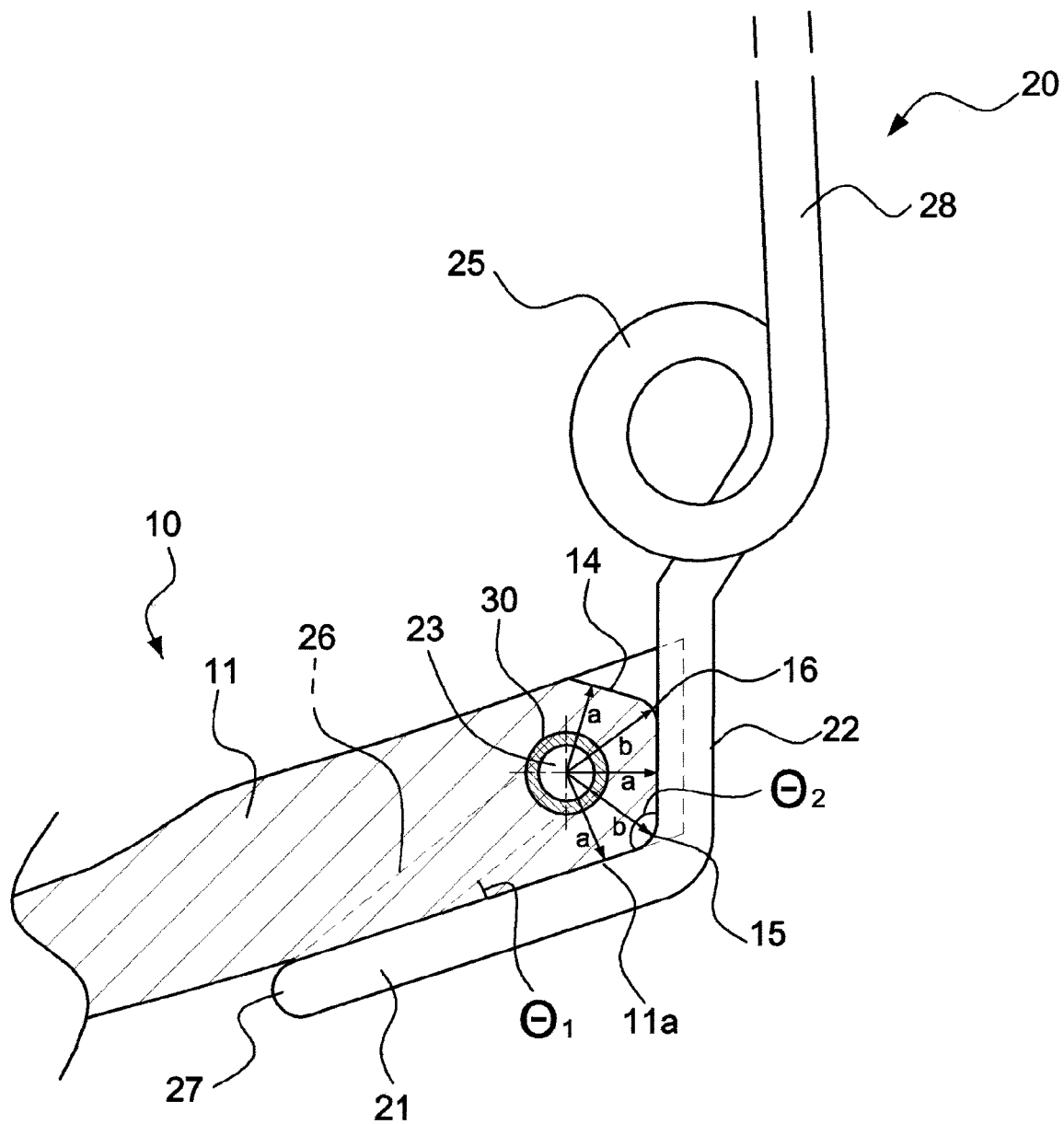
FIG. 12 is an enlarged planar cross-sectional view illustrating a state in which an eyeglass temple is unfolded according to the present disclosure.

As shown in FIG. 12, a distance to a front surface portion 11a of the glass frame 10 (or the installation portion 11) from the center of the hinge axis 23, a distance to the lateral flange groove 12 from the center of the hinge axis 23, and a distance to the rear flange groove 14 from the center of the hinge axis 23 may be indicated by 'a' and may be the same.

The distance 'a' may also be considered as a distance to the first support 21 from the center of the hinge axis 23 and a distance to the second support 22 from the center of the hinge axis 23.

Figure 14:
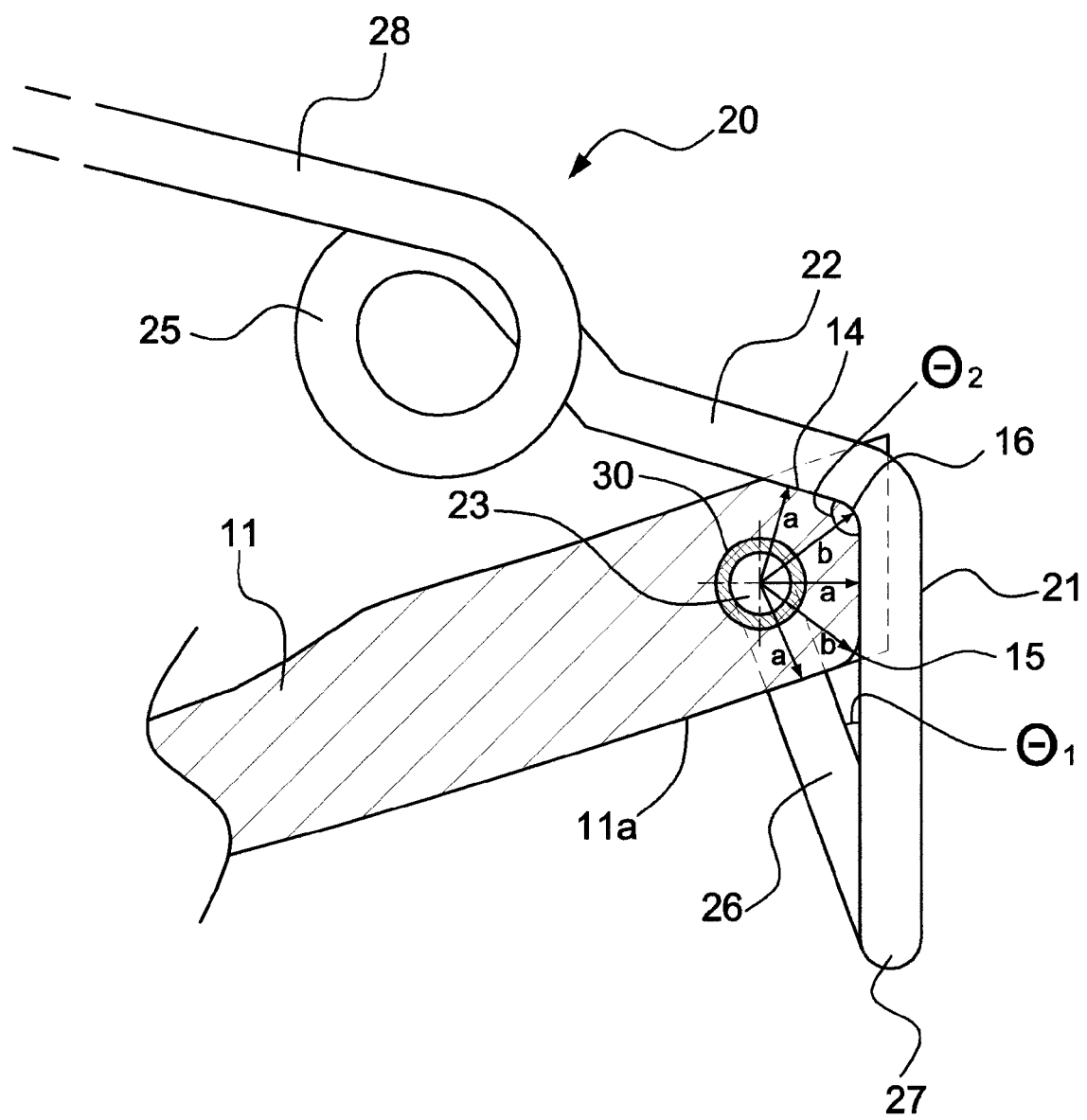
FIG. 14 is an enlarged planar cross-sectional view illustrating a state in which an eyeglass temple is folded according to the present disclosure.

When the distance to the first support 21 from the center of the hinge axis 23 and the distance to the second support 22 from the center of the hinge axis 23 are 'a', the eyeglass temple 20 is maintained in a final folded state or in a final unfolded state, as shown in FIGS. 12 and 14, the current state may be considered as a structurally stabilized state.

A first edge 15 may be formed between the front surface 11a and the lateral flange groove 12, and a second edge 16 may be formed between the lateral flange groove 12 and the rear flange groove 14.

The front surface 11a and the lateral flange groove 12 may be inclined with respect to each other, and the lateral flange groove 12 and the rear flange groove 14 may be inclined with respect to each other, and thus, the first and second edges 15 and 16 may be formed as described above.

A distance to the first edge 15 from the center of the hinge axis 23 and a distance to the second edge 16 from the center of the hinge axis 23 may be indicated by 'b' where 'b' is a value greater than 'a'.

The first and second edges 15 and 16 may function as a kind of flange and may prevent the state of the eyeglass temple 20 from being changed differently from user's intent when the eyeglass temple 20 is changed to a folded state (a state of FIG. 14) from an unfolded state (a state of FIG. 12) or is changed to the unfolded state from the folded state.

When a user applies external force that exceeds the first and second edges 15 and 16, the state of the eyeglass temple 20 may be changed, but when low external force (movement or vibration of glasses themselves) is applied differently from user's intent and the external force is too low to exceed the first and second edges 15 and 16, the first and second edges 15 and 16 may function as a flange to continuously maintain the current state.

In the state of FIG. 12, an inclination angle on a plane between the first extension portion 26 and the first support 21 is defined as $\theta_1$, and an inclination angle on a plane formed by bending the first support 21 and the second support 22 is defined $\theta_2$.

$\theta_2$ may also be an inclination angle between the front surface 11a and the lateral flange groove 12, or may also be an inclination angle between the lateral flange groove 12 and the rear flange groove 14, as shown in FIG. 14.

In the state of FIG. 12, elastic restoring force may be contained between the hinge axis 23 and the first extension portion 26, between the first extension portion 26 and the second extension 27, between the second extension 27 and the first support 21, and between the first support 21 and the second support 22, and thus, when external force is applied in order to change an arrangement state therebetween or a state of an inclination angle, restraint that resists the external force for the change may be provided by the elastic restoring force contained therebetween, and when the external force is removed, the eyeglass temple may be likely to return to the arrangement state of the above components and the state of the inclination angles $\theta_1$ and $\theta_2$.

Figure 13:
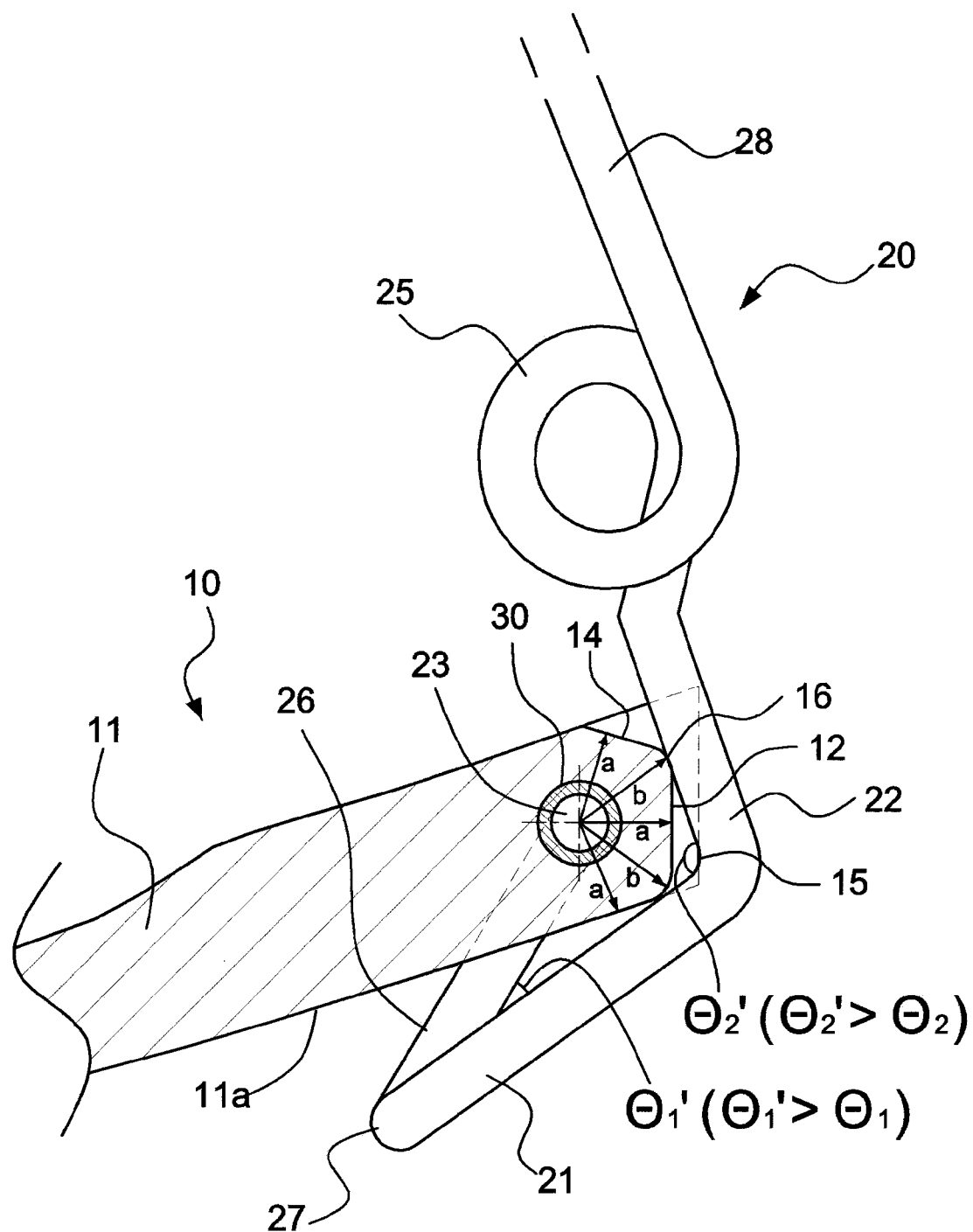
FIG. 13 is an enlarged planar cross-sectional view illustrating an intermediate position in which an eyeglass temple is changed to a folded state from an unfolded state.

With regard to the case in which external force is applied to fold the eyeglass temples 20, as shown in FIG. 13, the holder 28 may be moved in an inward direction of the glass frame 10, and the second support 22 may be moved away from the lateral flange groove 12 and may point-contact or line-contact the second edge 16 to increase a distance between the center of the hinge axis 23 and the second support 22 to 'b' from 'a'.

The first support 21 may be moved away from the front surface 11a and may point-contact or line-contact the first edge 15 to increase a distance between the center of the hinge axis 23 and the first support 21 to 'b' from 'a'.

The hinge axis 23 may be rotated, the first extension portion 26 connected to the hinge axis 23 may be moved outward, and the second extension 27 connected to the first extension portion 26 may also be moved away from the second extension 27.

In this state, when the first support 21 is moved away from the front surface 11a and point-contacts or line-contacts the first edge 15 in order to increase the distance between the center of the hinge axis 23 and the first support 21 to 'b' from 'a', elastic restoring force for obstructing this may be generated, and when the second support 22 is moved away from the lateral flange groove 12 and point-contacts or line-contacts the second edge 16 in order to increase the distance between the center of the hinge axis 23 and the second support 22 to 'b' from 'a', elastic restoring force for obstructing this may be generated.

As such, when a position change is to occur, a first inclination angle $\theta_1$ and a second inclination angle $\theta_2$ may also be increased, elastic restoring force for maintaining the inclination angles to the original inclination angles $\theta_1$ and $\theta_2$ may be generated.

Here, a region in which elastic restoring force is generated may include a region formed by bending the first extension portion 26, the second extension 27, and the first support 21 in a shape '⊏', and a region formed by bending the first support 21 and the second support 22 in a shape '∟'.

When the first support 21 passes the first edge 15, the first inclination angle may be increase to $\theta_1'$ from $\theta_1$. As described above, a distance between the first support 21 and the hinge axis 23 is increased to 'b' from 'a', but a distance between the hinge axis 23 and the second extension 27 is maintained as a distance of the first extension portion 26, and thus, the first inclination angle may be increased to $\theta_1'$ from $\theta_1$ by an angle corresponding to the increased length to 'b' from 'a' through elastic deformation.

When the second support 22 passes the second edge 16, the second inclination angle may be increased to $\theta_2'$ from $\theta_2$, an interval or an inclination angle between the first support 21 and the second support 22 may be temporally increased through elastic deformation.

When amplitude of external impact or vibration for changing the position of the eyeglass temple 20 is smaller than such elastic restoring force, the first support 21 may not pass the first edge 15, the second support 22 may not pass the second edge, and the first support 21 and the second support 22 may be restored to the original position due to the elastic restoring force.

In particular, in the case of the second extension 27, a lower end portion of the second extension 27, which is connected to the first extension portion 26, may not be distorted or may be distorted in an opposite direction to a direction in which an upper end portion of the second extension 27 is distorted. The end portion of the second extension 27, which is connected to the first support 21, may be distorted by a distortion increase $\theta_1'-\theta_1$ corresponding to an increased distance to 'b' from 'a', and in this regard, elastic restoring force that provides torsional resistance of the second extension 27 may act as resistance when the first support 21 passes the first edge 15.

The elastic restoring force for maintaining the original second inclination angle $\theta_2$ between the first support 21 and the second support 22 may also act as resistance when the first support 21 passes the first edge 15 and resistance when the second support 22 passes the second edge 16.

When external force that exceeds elastic restoring force generated in the aforementioned various regions is continuously applied, the first support 21 may pass the first edge 15 and the second support 22 may pass the second edge 16, and thus the eyeglass temple 20 may be changed to be folded, as shown in FIG. 14.

The first inclination angle may be restored to $\theta_1$, the second inclination angle may also be restored to $\theta_2$, a distance to the first support 21 from the center of the hinge axis 23 may also be restored to 'a' from b, and a distance to the second support 22 from the center of the hinge axis 23 may also be restored to 'a' from 'b'.

The first support 21 may be close to the lateral flange groove 12 to be supported thereby, and the second support 22 may be close to the rear flange groove 14 to be supported thereby.

The aforementioned situation in which elastic restoring force acts as resistance when the eyeglass temple 20 passes the first edge 15 and the second edge 16 and the situation in which the state of the eyeglass temple 20 is changed to exceed the resistance may be applied in the same way to the case in which the eyeglass temple 20 is changed to the folded state of FIG. 14 from the unfolded state of FIG. 12 and an inverse case in which the eyeglass temple 20 is changed to the unfolded state of FIG. 12 from the folded state of FIG. 14.

Figure 15:
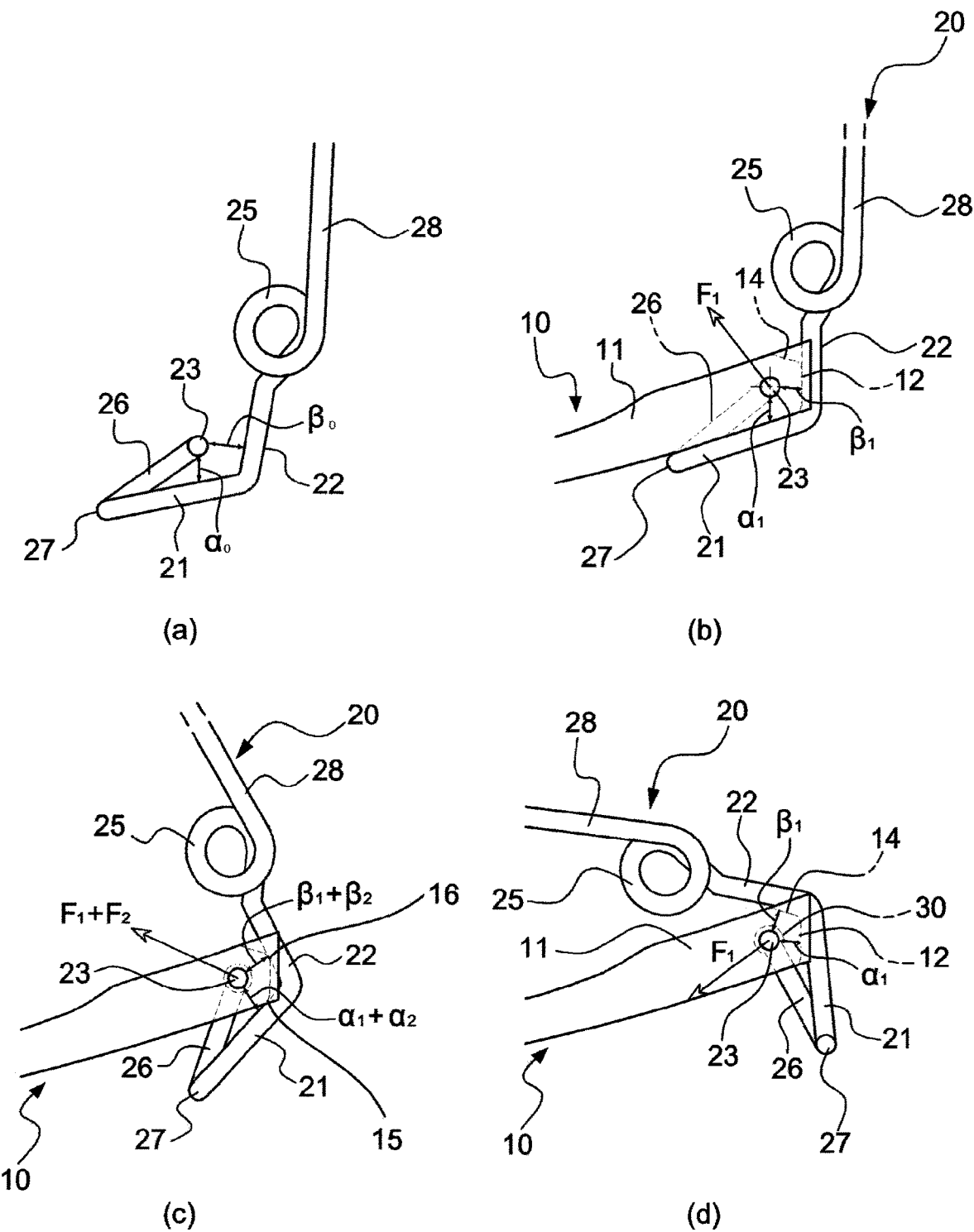
FIG. 15A is a plan view illustrating an interval between a hinge axis and first and second supports in an eyeglass temple according to the present disclosure.
FIGS. 15B to 15D are plan views illustrating a region in which eyeglass temples are supported when being coupled to a glass frame and a direction in which elastic restoring force acting as supporting force is applied according to the present disclosure.

FIG. 15A shows a case before the eyeglass temple 20 is inserted into the glass frame 10. FIGS. 15B to 15D show a state in which the eyeglass temple 20 is supported against the glass frame 10 and a direction of supporting force therefor in a state in which the eyeglass temple 20 is coupled to the glass frame 10.

As shown in FIG. 15A, in a state before the eyeglass temple 20 is inserted into the glass frame 10, a predetermined interval $\alpha_0$ between the hinge axis 23 and the first support 21 may be formed, and a predetermined interval $\beta_0$ between the hinge axis 23 and the second support 22 may also be formed.

In this state, as shown in FIG. 15B, when the eyeglass temple 20 is coupled to the glass frame 10, an interval between the hinge axis 23 and the first support 21 may be increased ($\alpha_1$), and an interval between the hinge axis 23 and the second support 22 may also be increased ($\beta_1$).

As such, an increase in the interval between the hinge axis 23 and the first support 21 and the interval between the hinge axis 23 and the second support 22 may mean that elastic deformation between corresponding portions may occur, and the eyeglass temple 20 may be stably fixed to the glass frame 10 by the elastic restoring force due to elastic deformation.

That is, as described above, the supporting region may be divided into a region in which support through the hinge axis 23 is performed, a region in which support through elastic restoring force toward the hinge axis 23 from the first support 21 is performed, that is, a region in which support through the first support 21 and the front surface of the glass frame 10 is performed, and a region in which support through elastic restoring force toward the hinge axis 23 from the second support 22 is performed, that is, a region in which support of the second support 22 and a lateral surface of the glass frame 10 is performed. That is, in the three regions, the eyeglass temple 20 may be supported against the glass frame 10.

Resultant force formed by synthesizing the elastic restoring force applied toward the hinge axis 23 from the first support 21 and the elastic restoring force applied toward the hinge axis 23 from the second support 22 may be indicated by $F_1$, and when glasses are viewed from the above, the direction of the resultant force may be embodied as an oblique direction on a rear surface of the glass frame 10 (a direction corresponding to the ⅔ quadrant in the drawing), as shown in FIG. 15B.

In this state, as shown in FIG. 15C, during a procedure of folding the eyeglass temple 20, when the first support 21 contacts the first edge 15, a distance between the first support 21 and the hinge axis 23 may be further increased ($\alpha_1+\alpha_2$). When the second support 22 contacts the second edge 16, a distance between the second support 22 and the hinge axis 23 may also be further increased ($\beta_1+\beta_2$).

This means that elastic restoring force applied toward the hinge axis 23 from the first support 21 and elastic restoring force applied toward the hinge axis 23 from the second support 22 are further increased ($F_1+F_2$), a tension state of the eyeglass temple 20 with respect to the glass frame 10 may be increased due to the increased elastic restoring force, and a direction of the resultant force therefrom may be directed in an inward direction of the glass frame compared with the case of FIG. 15A (a direction corresponding to the ⅔ quadrant in the drawing).

As described above, when force for folding the eyeglass temple 20 does not exceed elastic restoring force applied toward the hinge axis 23 from the first support 21 and elastic restoring force applied toward the hinge axis 23 from the second support 22, the first support 21 and the second support 22 may not pass the first and second edges 15 and 16 and may return to the original positions, and when the force for folding the eyeglass temple 20 exceed the elastic restoring forces, the first support 21 and the second support 22 may pass the first and second edges 15 and 16 and may be rapidly moved in a direction in which the eyeglass temple 20 is folded. This may also be applied in the same way to the case in which the eyeglass temple 20 is changed to an unfolded state from a folded state.

As shown in FIG. 15D, when the first support 21 passes the first edge 15 and the second support 22 passes the second edge 16 to fold the eyeglass temple 20, an interval between the hinge axis 23 and the first support 21 may be reduced again ($\alpha_1$) and an interval between the hinge axis 23 and the second support 22 may also be reduced ($\beta_1$). In this case, resultant force of the applied elastic restoring forces may return to $F_1$, and a direction of the resultant force may be more directed toward the front surface of the glass frame 10 than the direction of $F_1+F_2$ shown in FIG. 15C (a direction corresponding to the ¾ quadrant in the drawing).

Even in a state in which the eyeglass temple 20 is folded, the elastic restoring force applied toward the hinge axis 23 from the first support 21 and the elastic restoring force applied toward the hinge axis 23 from the second support 22 may be still present.

There are a first region in which support through the hinge axis 23 is performed, a second region in which support through force applied toward a lateral surface of the glass frame 10 from the first support 21 is performed, and a third region in which support through force applied toward a rear surface of the glass frame 10 from the second support 22 is performed, and thus, the eyeglass temple 20 may be maintained to be stably coupled to the glass frame 10.

While this invention has been particularly shown and described with reference to exemplary embodiments thereof, it will be understood by those skilled in the art that various changes in form and details may be made therein without departing from the spirit and scope of the invention as defined by the appended claims.

Therefore, the scope of the invention is defined by the appended claims.

The invention claimed is:

1. Glasses comprising:
a glass frame into which a lens is inserted;
a hinge axis rotatably inserted into a hinge hole of the glass frame;
a first extension portion extending in one side direction from a lower end portion of the hinge axis;
a second extension portion extending upward from an end portion of the first extension portion; and
a first support connected to the second extension portion and supported against a front or lateral surface of the glass frame; and
a second support connected to the first support in a bending form and supported against a lateral or rear surface of the glass frame,
wherein support through the hinge axis in a first region, support through the second extension portion and the first support in a second region, and support through the second support in a third region are performed,
wherein the glass frame includes a front surface portion, a lateral flange groove, a rear flange groove, a first edge between the front surface portion and the lateral flange groove, and a second edge between the lateral flange groove and the rear flange groove,
wherein a distance to the front surface portion from a center of the hinge axis, a distance to a lateral flange groove from the center of the hinge axis, and a distance to the rear flange groove from the center of the hinge axis are the same,
wherein a distance to the first edge from the center of the hinge axis and a distance to the second edge from the center of the hinge axis are the same,
wherein the distance to the first edge from the center of the hinge axis and the distance to the second edge from the center of the hinge axis are greater than the distance to the front surface portion from the center of the hinge axis, the distance to the lateral flange groove from the center of the hinge axis, and the distance to the rear flange groove from the center of the hinge axis,
wherein, when an eyeglass temple is folded or unfolded, the first and second edges act as resistance and cause elastic restoring force through elastic distortion deformation of the second extension portion and elastic restoring force through elastic deformation of an interval or an inclination angle between the first support and the second support,
wherein the hinge axis and the second extension portion are spaced apart from each other and are arranged in parallel to each other,
wherein the second extension portion is a torsion bar providing elastic restraint or elastic restoring force against distortion between the first extension portion and the first support when the eyeglass temple is rotated,
wherein a first inclination angle is formed between the first extension portion and the first support on a plane,
wherein a second inclination angle is formed between the first support and the second support,
wherein elastic deformation between the first extension portion and the second extension portion, elastic deformation between the second extension portion and the first support, and elastic deformation between the first support and the second support are performed, and the first inclination angle and the second inclination angle are temporally changed while the eyeglass temple is folded or unfolded.

2. The glasses of claim 1, wherein the hinge axis and the second extension portion are spaced apart from each other in a right and left direction;
wherein the first extension portion and the first support are spaced apart from each other in an up and down direction; and wherein the first support and the hinge axis are spaced apart from each other in a forward and backward direction.

3. An eyeglass temple comprising:
a hinge axis disposed in an up and down direction;
a first extension portion extending in one side direction from a lower end portion of the hinge axis;
a second extension portion extending in an opposite direction to a direction in which the hinge axis extends from an end portion of the first extension portion;
a first support connected to one end portion of the second extension portion and extending in a direction that crosses a direction in which the second extension portion extends; and
a second support connected to the first support in a bending form and extending in a backward direction compared with the first support,
wherein support through the hinge axis in a first region, support through the second extension portion and the first support in a second region, and support through the second support in a third region are performed,
wherein a distance to the first support from a center of the hinge axis and a distance to the second support from the center of the hinge axis are the same,
wherein a distance to a portion at which the first support and the second support are bent from the center of the hinge axis is greater than a distance to the first support from the center of the hinge axis and the distance to the second support from the center of the hinge axis,
wherein, when the eyeglass temple is folded or unfolded, if the first support and the second support are caught by a predetermined flange resistance region, elastic restoring force through elastic distortion deformation of the second extension portion and elastic restoring force through elastic deformation of an interval or an inclination angle between the first support and the second support are caused,
wherein the hinge axis and the second extension portion are spaced apart from each other and are arranged in parallel to each other,
wherein the second extension portion is a torsion bar providing elastic restraint or elastic restoring force against distortion between the first extension portion and the first support when the eyeglass temple is rotated,
wherein a first inclination angle is formed between the first extension portion and the first support on a plane,
wherein a second inclination angle is formed between the first support and the second support,
wherein elastic deformation between the first extension portion and the second extension portion, elastic deformation between the second extension portion and the first support, and elastic deformation between the first support and the second support are performed, and the first inclination angle and the second inclination angle are temporally changed while the eyeglass temple is folded or unfolded.

4. The eyeglass temple of claim 3, wherein the hinge axis and the second extension portion are spaced apart from each other in a right and left direction;
wherein the first extension portion and the first support are spaced apart from each other in an up and down direction; and
wherein the first support and the hinge axis are spaced apart from each other in a forward and backward direction.

* * * * *